Dec. 25, 1962   R. C. WEBSTER   3,070,447
METHOD OF TREATING CORN
Filed Nov. 25, 1960

INVENTOR.
ROBERT C. WEBSTER
BY
AGENT 3,070,447
METHOD OF TREATING CORN
Robert C. Webster, Madison, Wis., assignor to Air Reduction Company, Incorporated, New York, N.Y., a corporation of New York
Filed Nov. 25, 1960, Ser. No. 71,751
3 Claims. (Cl. 99—193)

This invention relates to the preparation of corn for packaging.

It is the usual practice to remove kernels of corn from the cob as one step in preparing corn for packaging; and because of the way in which each kernel fits into a recess in the cob, the removal usually severs the upper part of the kernel from the lower or inner part that is recessed into the cob. Thus, the hull of the kernel is broken open and part of each kernel is wasted, including much or all of the germ of the kernel.

It is an object of this invention to provide an improved method of preparing corn for packaging and to remove each kernel of the corn from the cob with the kernel intact and containing the germ of the corn.

The invention removes kernels from the cob with the kernels in a frozen condition. The kernels and at least the adjacent portions of the cob are frozen quickly by contact with a low-temperature liquefied gas, and while in this frozen condition, are subjected to agitation which produces relative movement of the kernels and cob, with resulting breaking away of the kernels from the cob.

Other objects, features and advantages of the drawing will appear or be pointed out as the description proceeds.

In the drawing, forming a part hereof, in which like reference characters indicate corresponding parts in all the views.

Figure 1:
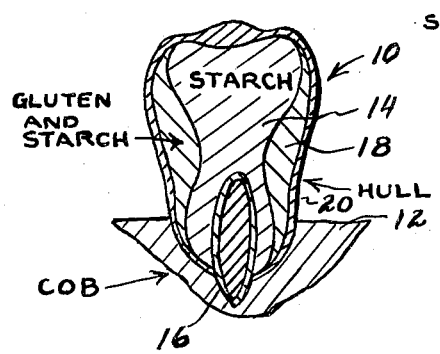
FIG. 1 is a greatly enlarged sectional view through a kernel of corn and a portion of a cob to which the kernel is attached.

FIG. 1 shows a corn kernel 10 attached to a cob 12. The kernel 10 has a middle section 14 which consists essentially of starch, and at the base of this middle section 14, the germ of the kernel is located. This germ is designated by the reference character 16.

Around the sides of the middle section 14 there is a layer 18 of gluten and starch; and the entire kernel is covered by a hull 20. The lower end of the kernel fits into a recess in the cob 12 and is held on the cob by the portion of the cob that contacts with the kernel at this recess.

Figure 2:
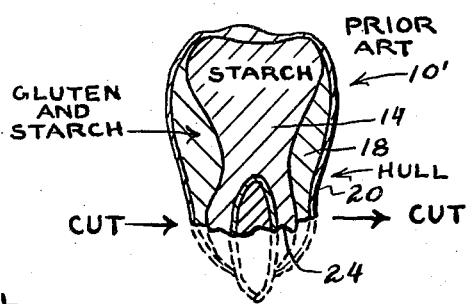
FIG. 2 is a sectional view showing the way in which a kernel is cut upon removal from a cob in accordance with conventional practice.

When the kernel is cut from the cob in accordance with the practices of the prior art, it is severed along the top of the recess in the cob, leaving the hull broken open and much, if not all, of the germ 16 severed from the kernel. FIGURE 2 shows a kernel 10' cut from the cob along a severance line 24.

This invention removes the kernels from the cob without cutting. A comparison of a typical prior art method with the preferred operation of this invention is shown in block flow diagrams in FIGS. 3 and 4. In both methods the raw product is first passed through a husker and is then washed.

Figure 3:
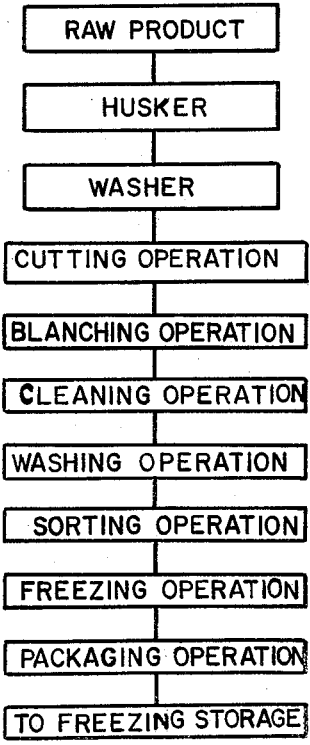
FIG. 3 is a block diagram illustrating the successive steps in preparing and packaging corn in accordance with the prior art.

In the process illustrated in FIG. 3, the kernels are then cut from the cob and blanched. Sometimes these steps are reversed and the kernels are blanched before being cut from the cob. After further cleaning, washing and sorting operations, the kernels are frozen, if the corn is to be merchandised in a frozen state, and the frozen kernels are packaged and stored.

Figure 4:
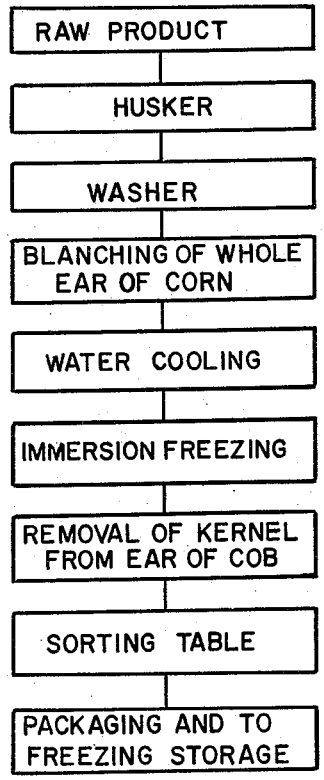
FIG. 4 is a block diagram showing the successive steps in preparing and packaging corn by the process of this invention.

FIG. 4 shows the third step of the process as a blanching of the kernels while on the cob. This gives improved quality to the corn, particularly if the corn is to be packaged in a frozen state, or used for canning or in other products such as frozen peas and corn, etc.

Blanching on the cob is usually done with steam, such as by exposing the kernels to flowing steam for a period of approximately six to eight minutes, and results in substantial heating of the kernels and the cob, it is advantageous and more economical to initially cool the corn by water immersion and spraying after the blanching operation, but the corn can be covered by the liquefied gas without this cooling step, if desired.

With the corn at about room temperature, or somewhat below depending upon the temperature and time of the water cooling, the kernels are frozen quickly by immersion in (or spraying with) low-temperature liquefied gas having a temperature at least as low as minus 100° F. Liquefied nitrogen or nitrous oxide which are highly suitable for use with foods and readily available in ample commercial quantities are most advantageous for the purpose. Other liquefied gases can be used if the temperature is at least as low as −100° F. and they are suitable for use with food. Advantageously, the application of the liquefied gas to the corn is carried out substantially at atmospheric pressure to facilitate the procedure and make possible the use of the simplest apparatus for the operation.

The kernels and at least the adjacent portions of the cob are frozen solid within about four minutes and preferably within one or two minutes and the next step is the removal of the kernels from the cob. This is done by the force of a pressure which may be applied in a tumbling barrel or by use of soft rubber rollers against or between which the ear of corn is pressed, but preferably with a conventional shelling machine such as used for seed corn. The kernels break loose from the cob with each kernel completely intact.

The kernels pass to a sorting table and then to a packaging station. If they are to be packaged in a frozen condition, this can be done while they remain frozen from the severance-from-the-cob operation. If the package is not to be in a frozen state, the kernels are allowed to melt.

One advantage of the invention is the saving of waste and resulting increased yield from each bushel of corn. Another is that none of the germ or heart of the kernel is lost. Another and important advantage is that the hull of the kernel is not broken. This protects the corn from the loss of valuable constituents such as occurs in the handling, processing and packaging of corn kernels that have been cut from the cob and the hulls broken in accordance with the practices of the prior art.

The preferred operation of the invention has been illustrated and described, but changes and modifications can be made and some features can be used in different com-

What is claimed is:

1. The method of preparing corn for packaging which method comprises blanching a husked ear of corn, rapidly freezing said blanched ear of corn by direct contact with a liquefied gas having a temperature at least as low as $-100°$ F. such that the kernels of said ear of corn are frozen and at least a portion of the cob adjacent to the kernels is also frozen, producing relative movement of the kernels and cob while so frozen and by said movement separating the whole kernels from the cob.

2. The method of preparing corn for packaging in accordance with claim 1, wherein said liquefied gas is nitrous oxide.

3. The method of preparing corn for packaging in accordance with claim 1, wherein said liquefied gas is nitrogen.

References Cited in the file of this patent

UNITED STATES PATENTS

| | | |
|---|---|---|
| 2,085,051 | Taylor | June 29, 1937 |
| 2,447,249 | Hill | Aug. 17, 1948 |

OTHER REFERENCES

Tressler et al.: "The Freezing Preservation of Foods," vol. I, July 2, 1957, The Avi Publishing Co., Westport, Conn., pp. 428–434.